May 24, 1966  R. I. NAGEL  3,253,138

LIGHT STRUCTURE

Filed June 6, 1963  4 Sheets-Sheet 1

May 24, 1966  R. I. NAGEL  3,253,138
LIGHT STRUCTURE
Filed June 6, 1963  4 Sheets-Sheet 3

May 24, 1966  R. I. NAGEL  3,253,138

LIGHT STRUCTURE

Filed June 6, 1963  4 Sheets-Sheet 4

3,253,138
LIGHT STRUCTURE
Robert I. Nagel, Skokie, Ill., assignor to Elastic Stop Nut Corporation of America, Union, N.J., a corporation of New Jersey
Filed June 6, 1963, Ser. No. 285,960
6 Claims. (Cl. 240—11.2)

This invention relates generally to light structures, and more particularly to a signal lantern employing an improved optical system for increasing the efficiency of light transmission by the signal lantern. The light structure of the present invention is particularly useful for buoys, beacons, channel lights and the like.

Because of the necessity of providing good light signals in all kinds of weather, it is important that a signal lantern, such as a marine signal lantern, transmit as much light as possible from the available light source within the lantern. Mirrors of various shapes have been proposed for incorporation in the optical systems of signal lanterns to increase their light producing efficiency. While some of these mirrors increase the intensity of light transmitted by the lanterns, they do not increase to the overall width of the light beams produced. Other mirrors add to the overall width of the transmitted light beams, but these mirrors usually have curved surfaces that are relatively difficult and expensive to produce, as compared to mirrors that have plane or simple conical reflecting surfaces.

It is an object of the present invention to provide an improved optical system for a light structure to utilize some of the light energy that is normally lost in some prior art light structures.

It is another object of the present invention to provide in a signal lantern an improved optical bird spike for discouraging birds from roosting on the lantern, and in addition, for reclaiming some of the light energy normally lost by some conventional signal lanterns.

Still another object of the present invention is to provide an improved light structure for increasing the width of a transmitted light beam beyond the width of a drum lens employed by the light structure.

A further object of the present invention is to provide an improved signal lantern employing a drum lens for transmitting light in desired directions, a collimator for intercepting light that would normally pass through an opening in the drum lens, and a reflector for reflecting the collimated light in the aforementioned directions, the latter reflected light not necessarily passing through said drum lens.

Still a further object of the present invention is to provide an improved light structure of the type described that is relatively simple in structure, easy to construct and operate, and yet highly efficient in use.

Briefly, the improved light structure of the present invention comprises an optical system having a refracting lens, a collimator, and a reflector for reflecting the collimated light. The refracting lens may comprise a drum fresnel lens, for example, adapted to refract light from a light source disposed on the central axis of the drum lens. The collimator may comprise a collimating fresnel lens, for example, disposed to intercept and to collimate light from the light source that would normally pass through an opening at one end of the drum lens. The reflector may comprise an inverted cone, for example, disposed so as to reflect the collimated light in a desired direction, but not necessarily through the drum lens. Thus, the width of the light beam transmitted by the light structure can be wider than the height of the drum lens. A bird spike structure, comprising an upright cone, may be fixed to the inverted cone for discouraging birds from roosting on the light structure and for protecting the light reflecting surface on the inverted cone.

The novel features of the present invention, as well as the invention itself, both as to its organization and method of operation, will be understood in detail from the following description, when considered in connection with the accompanying drawings in which similar reference characters designate similar parts throughout, and in which.

Figure 1:
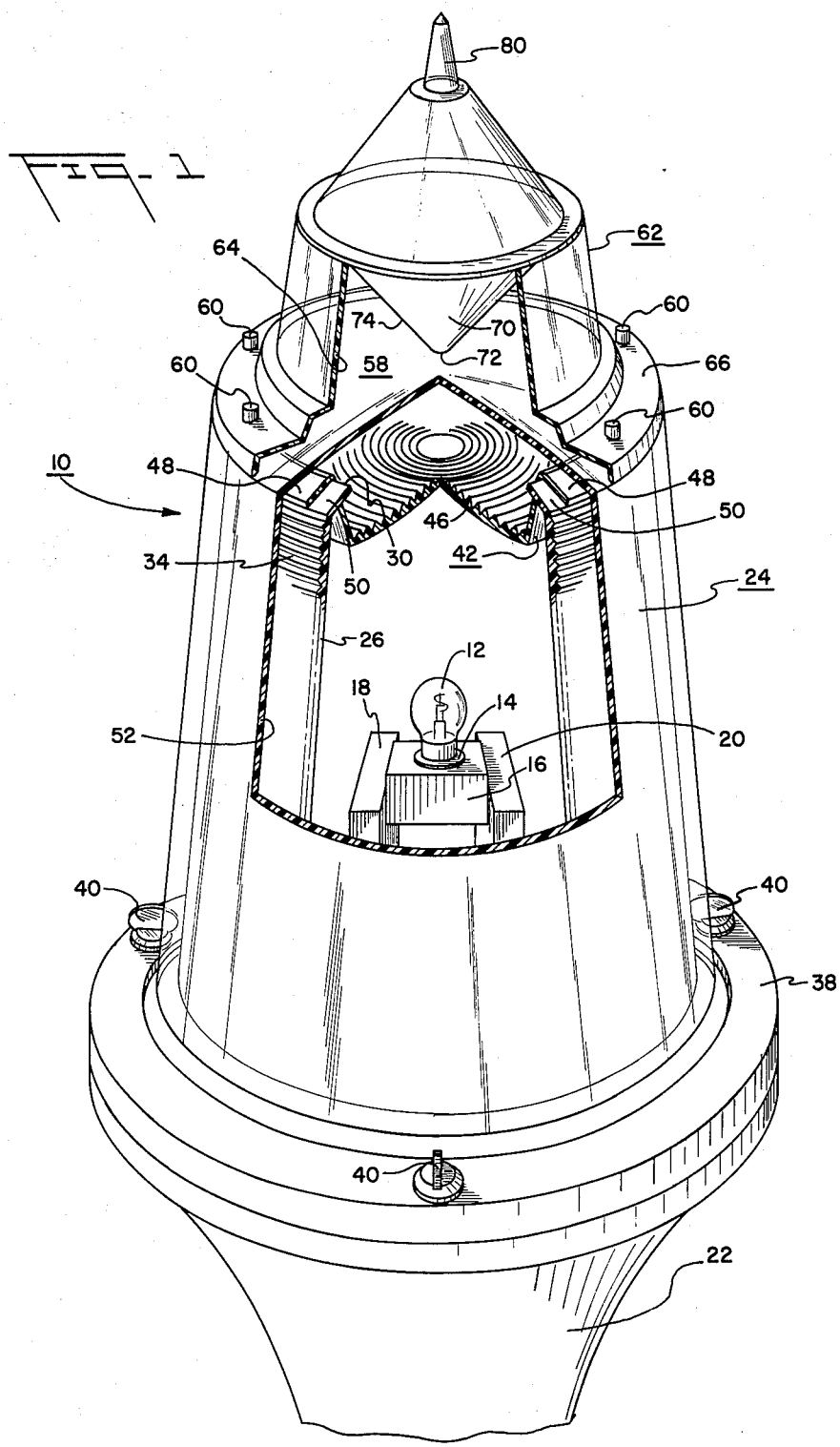
FIG. 1 is a perspective view of a light structure, with parts cut away to show the internal construction, in accordance with the present invention.
Figure 2:
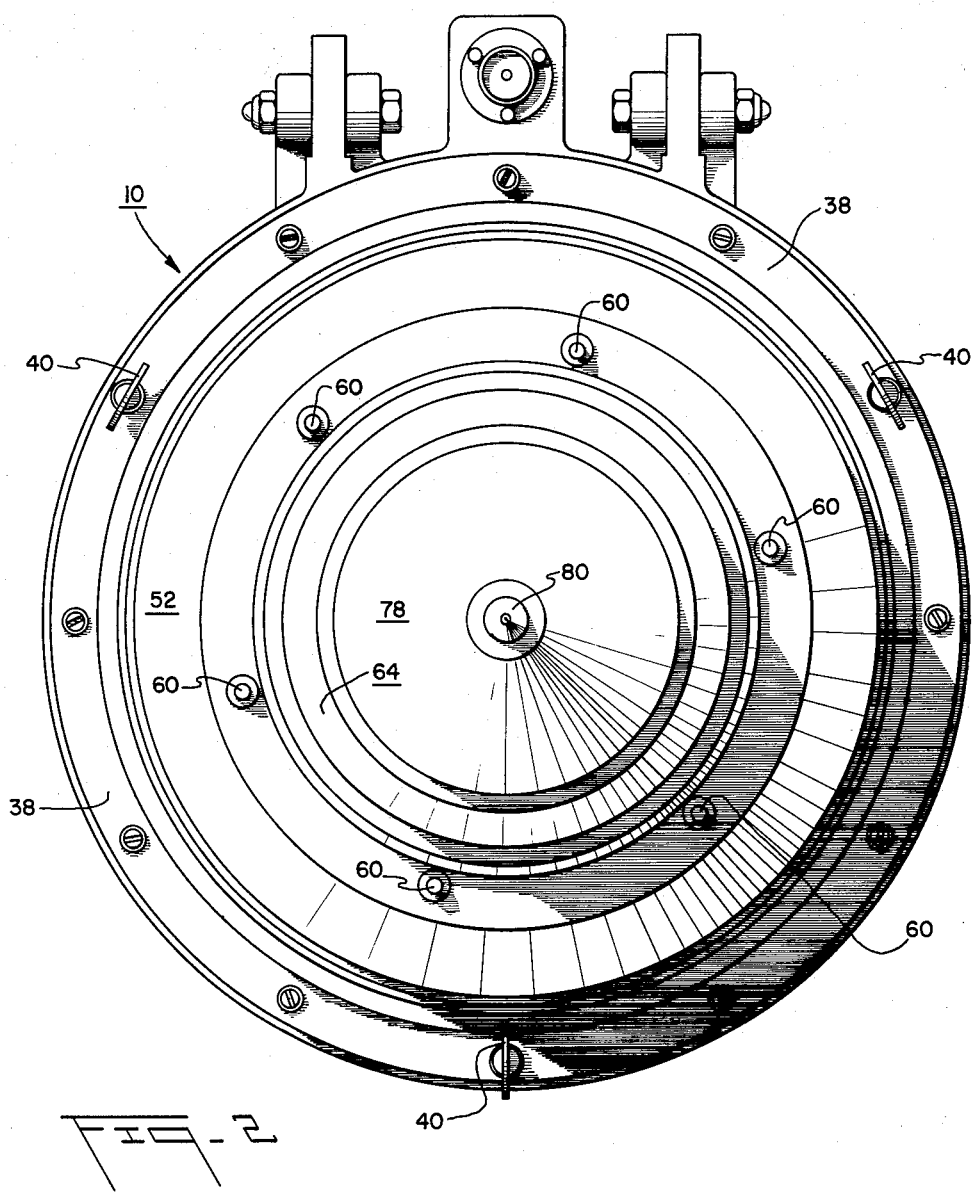
FIG. 2 is a plan view of the light structure shown in FIG. 1.
Figure 3:
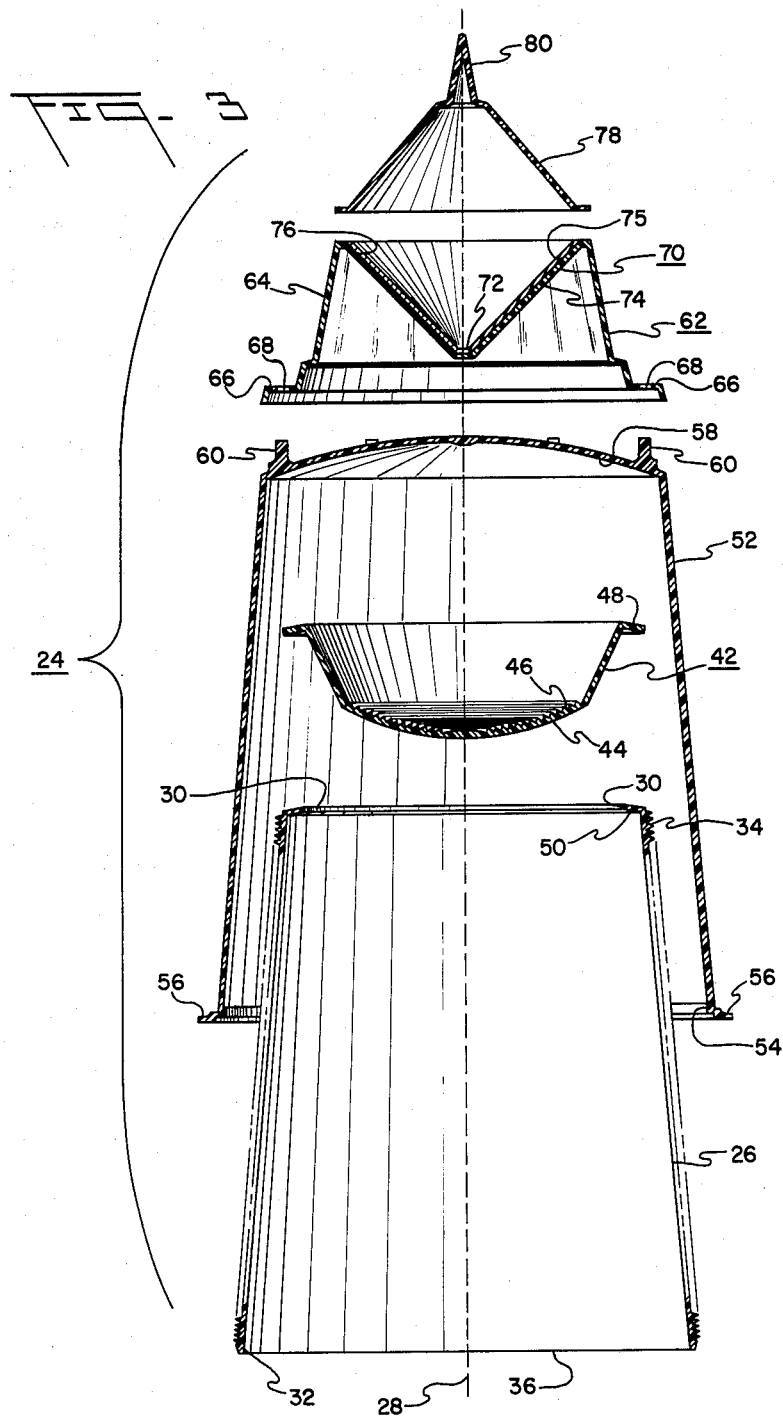
FIG. 3 is an exploded view of the optical system of the light structure shown in FIGS. 1 and 2, in accordance with the present invention.

Referring, now, particularly to FIGS. 1, 2 and 3 of the drawings, there is shown an improved light structure 10, such as a marine signal lantern, for transmitting light from a light source 12 in a predetermined angle of divergence. The light source 12 may comprise an incandescent lamp within a socket 14 in a member 16, the latter being supported between two brackets 18 and 20. The brackets 18 and 20 are fixed to a metal base 22, the latter providing means for positioning and anchoring the light structure 10 to a fixed installation. The base 22 also serves to support the optical system 24 of the light structure 10.

Referring now, particularly to FIGS. 1 and 3 of the drawings, the optical system 24 is shown comprising a refracting lens in the form of a drum fresnel lens 26 having a central axis in alignment with the optical axis 28 of the optical system 24. The drum fresnel lens 26 is a truncated cone, that is, an upwardly and inwardly tapered barrel lens, having an upper opening 30 of smaller diameter than a lower opening 32. The drum fresnel lens 26 has an outer grooved surface 34 to project light, from the light source 12, in a beam over a desired angle of divergence. In marine signal lanterns of the type described by the light structure 10, the desired angle of divergence is very slight, if any, and may be zero degrees.

The lower rim 36 of the drum fresnel lens 26 is fixed to an annular member 38, usually metallic, by any suitable means, to provide a good air and watertight seal therewith. The annular member 38 is hinged to the base 22 so that the annular member 38, together with the optical system 24 fixed thereto, may be separated from the base 22 to provide access to the interior of the light structure 10. The battery and other electrical components (not shown) for operating the light source 12 are usually supported within the base 22. The annular member 38 is secured to the base 22 by means of winged-head screws 40.

Means are provided to collimate the light from the light source 12 that would normally pass through the upper opening 30 of the drum lens 26. To this end, there is provided a dish-shaped member 42 having a lower portion 44 that is a light collimator 46. The collimator 46 is in the form of a collimating fresnel lens of the type adapted to cause light that impinges upon it to emerge from it in parallel rays. The dish-shaped member 42 is formed with an upper outwardly extending flange 48 that is adapted to rest upon an inwardly extending flange 50 of the drum lens 26, the latter flange 50 defining the upper opening 30 of the drum lens 26.

The drum lens 26 and the collimator 46 are covered by a transparent housing 52 for protective purposes. The housing 52 is in the form of a truncated cone having an opening 54 at its lower end. The housing 52 is formed with a lower outwardly extending flange 56 for securing the housing 52 to the annular member 38, by any suitable means, to form an air and watertight seal with the annular member 38, the top wall 58 of the housing 52 is disposed over the flange 48 of the dish-shaped member 42 for holding the latter disposed within the opening 30 of the drum lens 26. The upper wall 58 is formed with a plurality of upwardly extending studs 60 for supporting a member 62 thereby. The member 62 comprises a substantially truncated, hollow, upright cone 64 of transparent material. The lower portion of the member 62 is formed with a flange 66 having a plurality of holes 68 therein for receiving the studs 60 therethrough for fastening purposes.

Figure 4:
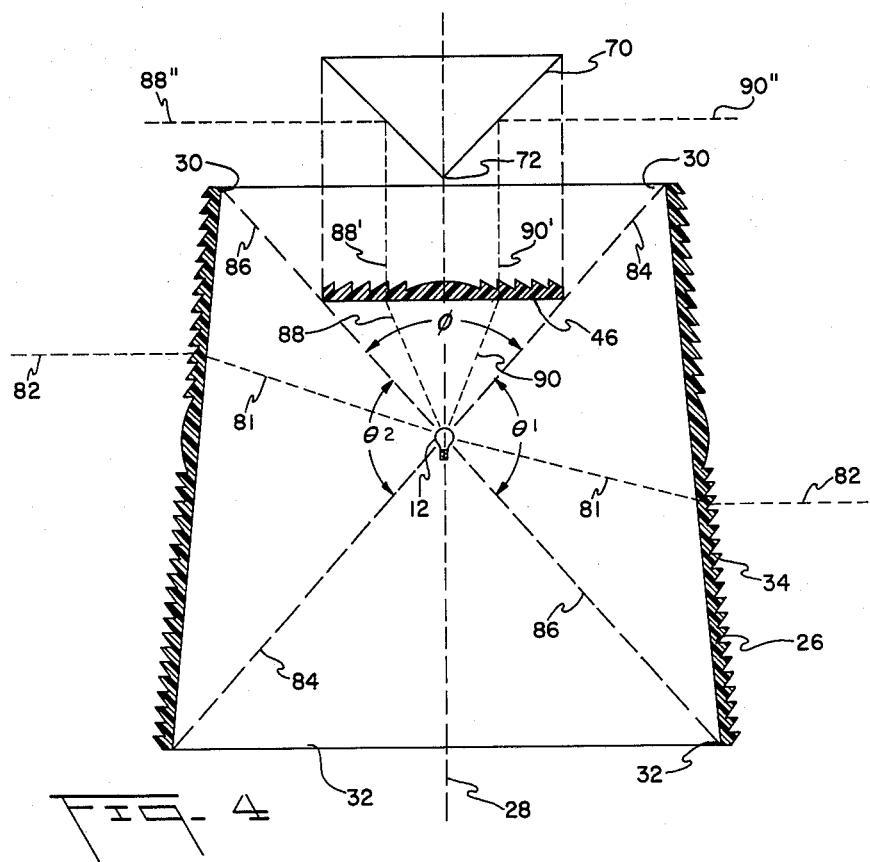
FIG. 4 is a schematic diagram of the optical system illustrated in FIG. 3, showing the refraction of light rays through the lenses and the reflection of light rays by the reflector of the optical system, in accordance with the present invention.

A reflector in the form of an inverted cone 70, preferably hollow, depends from the upper portion of the hollow truncated cone 64. The cone 70 has an apex 72 disposed on the optical axis 28 of the optical system 24, the axis of the cone 70 being in alignment with the optical axis 28. Either the outer surface 74 or the inner surface 76 of the hollow cone 70 has a light-reflecting surface, such as a mirror coating, for reflecting light impinging upon it. The cone 70, illustrated in FIGS. 1, 3 and 4, is shown as a substantially 90 degree cone, but it is understood that cones other than 90 degree cones may be used to obtain any desired angle of divergence, as will be explained hereinafter.

An upright, truncated cone 78, preferably hollow, has its base fixed to the base of the inverted cone 70 by any suitable means. Where the cones 70 and 78 are of acrylic plastic, their bases may be cemented to each other by any suitable waterproof plastic adhesive. A sharp spike 80 is fixed to the upper portion of the truncated cone 78 to discourage gulls and other birds from roosting on the light structure 10 to prevent obvious interference with the light transmitting function of the light structure 10.

Where, for example, the inner surface 76 of the otherwise transparent cone 70 is coated with a coating 75 of a light reflecting metal, such as silver or aluminum, oxidation and deterioration of the coating 75 is prevented by the protective covering comprising the upright cone 78 and the bird spike 80.

The operation of the optical system 24 of the light structure 10 will now be described with particular reference to the schematic diagram of FIG. 4. When the light source 12 is energized from electrical components (not shown) within the base 22, light rays 81 from the light source 12 that impinge upon the drum lens 26 emerge as transmitted rays in the direction indicated by the dashed lines 82. The outer grooved surface 34 of the drum lens 26, however, can provide any desired angle of divergence, including a zero angle of divergence. The dashed lines 84 and 86 that form the angles Theta 1 and Theta 2 define the boundary limits of the rays from the light source 12 that impinge upon the drum lens 26. The upper angle Phi between the dashed lines 84 and 86 indicates the boundary of rays that normally would pass through the upper opening 30 of the drum lens 26, such as rays 88 and 90, for example. Normally, this light is lost when means are not provided to utilize it.

In accordance with the present invention, the rays of light, such as the rays 88 and 90, for example, that would normally pass through the opening 30 in the drum lens 26 are collimated by the collimator 46 so as to provide parallel, transmitted rays 88' and 90' to the cone 70. By selecting a cone of the proper vertex angle, the parallel rays 88' and 90' impinging upon the cone 70 are reflected in any desired directions, as shown, for example by reflected rays 88" and 90". Thus, for example, the reflected rays 88" and 90" may be parallel to the rays 82 emanating from the drum lens 26. If desired, however, the reflected rays from the cone 70 with a suitably chosen vertex angle may be in such a direction as to form a desired angle of divergence with the light rays 82 from the drum lens 26. It will be noted that the overall width of the beam of light transmitted from the optical system 24, including the cone 70, is greater than that portion of the beam transmitted by the drum lens 26 alone. Since the apex 72 of the inverted cone 70 is substantially adjacent to the plane defined by the upper rim of the drum lens 26, the width of the transmitted beam from the light structure 10 may extend from the bottom of the drum lens 26 to the base of the inverted cone 70. Light reflected from the cone 70 passes through the transparent material of the truncated upright cone 64.

Since the reflector cone 70 is a conical shape whose surface may be generated by the rotation of a straight line around a vertical axis, it is relatively simple to construct and is relatively inexpensive in comparison to conical structures whose surfaces are curves of revolution.

Thus, there has been described an improved light structure employing an optical system by means of which light that is normally wasted may be reclaimed and added to a beam formed by a drum lens. While only one embodiment of the improved light structure has been described, various modifications of the present invention will, no doubt, suggest themselves to those skilled in the art without departing from the spirit of the invention. Hence it is desired that the foregoing description shall be considered as illustrative and not in a limiting sense.

What is claimed is:

1. A signal lantern for projecting a signal throughout a given area, said lantern comprising a drum lens having an axis and a focal point on said axis and having an open upper end subtending a predetermined angle with respect to said focal point, means for mounting a light source at said focal point, a lens panel including a collimating portion of predetermined diameter smaller than the diameter of said open upper end and having an axis coincident with the axis of said drum lens and a focal point coincident with the focal point of said drum lens and positioned within said drum lens between the focal point thereof and said open upper end and substantially subtending said predetermined angle so as to intercept and collimate light emanating from said focal point into a beam centered on the axis of said drum lens and of said predetermined diameter and passing through said open upper end, and a reflector centered on the axis of said drum lens above said collimating portion to reflect light received by said reflector from said collimating portion into a desired zone, the diameter of said reflector being less than the diameter of said open upper end and substantially the same as said predetermined diameter.

2. The invention set forth in claim 1 wherein said reflector is conical and is positioned above said open upper end and the axis of said cone is coincident with the axis of said drum lens and the apex of the cone points toward said collimating portion.

3. The invention set forth in claim 2 wherein the angle of said cone is 90°.

4. The invention set forth in claim 1 wherein said lens panel has an outwardly extending flange resting on said open upper end of said drum lens.

5. The invention set forth in claim 4 wherein said lantern further has a transparent cover placed over said drum lens and said lens panel, said cover engaging said outwardly extending flange of said lens panel to hold the same in position and said reflector is mounted on said cover.

6. The invention set forth in claim 5 wherein a bird spike is mounted on said reflector.

References Cited by the Examiner

UNITED STATES PATENTS

| | | | |
|---|---|---|---|
| 543,730 | 7/1895 | Heap | 240—1.2 |
| 1,759,368 | 5/1930 | Piron | 240—25 |
| 2,092,664 | 9/1937 | Bray | 240—22 |
| 2,344,221 | 3/1944 | Trautner | 240—106.1 X |

FOREIGN PATENTS 614,630  12/1948  Great Britain.

NORTON ANSHER, *Primary Examiner.*

C. R. RHODES, *Assistant Examiner.*